US010725553B2

(12) United States Patent
Li (10) Patent No.: US 10,725,553 B2
(45) Date of Patent: Jul. 28, 2020

(54) GESTURE RECOGNITION DEVICE, GESTURE RECOGNITION METHOD, AND GESTURE RECOGNITION SYSTEM (71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 15 days.

(21) Appl. No.: 16/042,091

(22) Filed: Jul. 23, 2018

(65) Prior Publication Data

US 2019/0204930 A1 Jul. 4, 2019

(30) Foreign Application Priority Data

Jan. 2, 2018 (CN) .......................... 2018 1 0001744

(51) Int. Cl.
G06F 3/01 (2006.01)
G06F 3/03 (2006.01)
H04N 21/4223 (2011.01)
H04L 29/08 (2006.01)
H04L 29/06 (2006.01)
H04N 21/426 (2011.01)

(52) U.S. Cl.
CPC .......... G06F 3/017 (2013.01); H04L 65/4092 (2013.01); H04L 65/607 (2013.01); H04N 21/426 (2013.01); H04N 21/4223 (2013.01)

(58) Field of Classification Search
CPC ....... G06F 3/017; G06F 3/0304; H04L 65/60; H04L 65/607; H04N 21/4223
See application file for complete search history.

(56) References Cited

U.S. PATENT DOCUMENTS

2016/0080888 A1* 3/2016 Kreitzer ................. H04B 1/385
455/39
2017/0091542 A1* 3/2017 Levy ....................... G06F 3/017
2019/0107894 A1* 4/2019 Hebbalaguppe ..... G06K 9/6256

FOREIGN PATENT DOCUMENTS

CN 101431673 A 5/2009
CN 102523502 A 6/2012
CN 102609093 A 7/2012
(Continued)

OTHER PUBLICATIONS

Chinese Office Action in corresponding Chinese Application No. 201810001744.3 dated Feb. 7, 2020 (an English translation attached hereto). 31 pages.

*Primary Examiner* — Xuemei Zheng
(74) *Attorney, Agent, or Firm* — Leason Ellis LLP (57) ABSTRACT A gesture recognition device includes an image acquisition unit, a video encoding unit, a first network communication unit, and an instruction execution unit. The image acquisition unit is configured to acquire gesture image data; the video encoding unit is configured to encode the gesture image data to form video stream data; the first network communication unit is configured to transmit the video stream data and receive a gesture manipulation command; and the instruction execution unit is configured to perform a corresponding control operation in accordance with the gesture manipulation command. The gesture recognition device can meet the requirements of real-time interaction without high-performance computing power. A gesture recognition method and a gesture recognition system are also provided.

8 Claims, 8 Drawing Sheets (56) References Cited

FOREIGN PATENT DOCUMENTS

| | | | |
|---|---|---|---|
| CN | 102663364 | A | 9/2012 |
| CN | 102999152 | A | 3/2013 |
| CN | 103105928 | A | 5/2013 |
| CN | 104580143 | A | 4/2015 |
| CN | 104992171 | A | 10/2015 |
| CN | 105045122 | A | 11/2015 |
| CN | 105530449 | A | 4/2016 |
| CN | 104144345 | B | 8/2016 |
| CN | 106952348 | A | 7/2017 |

* cited by examiner

GESTURE RECOGNITION DEVICE, GESTURE RECOGNITION METHOD, AND GESTURE RECOGNITION SYSTEM

The present disclosure claims priority of Chinese Patent Application No. 201810001744.3 filed on Jan. 2, 2018, the disclosure of which is hereby entirely incorporated by reference as a part of the present disclosure.

TECHNICAL FIELD

At least one embodiment of the present disclosure relates to a gesture recognition device, a gesture recognition method, and a gesture recognition system.

BACKGROUND

With the increasing variety and quantity of electronic devices, the popularity has become more and more widespread, and human-machine interaction between users and electronic devices has also evolved from simple interaction methods through peripherals such as remote controls, mice, and keyboards to diverse interactions such as voice interaction, somatosensory interaction, eye movement interaction, and gesture interaction. Among them, the gesture interaction is more natural and convenient, and is greatly demanded in many application scenarios.

In the gesture interaction, gesture recognition is required to complete the interaction. Since calculation process of gesture recognition is relatively complicated and the real-time requirement is relatively high, the hardware device for gesture recognition needs to have high computing power to meet the demand. For example, in a digital set-top box that is basically popular in the home, the shortage in computing power may cause the image processing time to be too long, so that the requirement of real-time interaction cannot be met.

SUMMARY

At least one embodiment of the present disclosure provides a gesture recognition device comprising an image acquisition unit, a video encoding unit, a first network communication unit, and an instruction execution unit. The image acquisition unit is configured to acquire gesture image data. The video encoding unit is configured to encode the gesture image data to form video stream data. The first network communication unit is configured to transmit the video stream data and receive a gesture manipulation command. The instruction execution unit is configured to perform a corresponding control operation in accordance with the gesture manipulation command.

At least one embodiment of the present disclosure provides a gesture recognition method, comprising: acquiring gesture image data; encoding the gesture image data to form video stream data and transmitting the video stream data to a gesture recognition server; and receiving a gesture manipulation command returned by the gesture recognition server, and performing a control operation corresponding to the gesture manipulation command.

At least one embodiment of the present disclosure provides a gesture recognition method, comprising: receiving video stream data comprising gesture image data; decoding the video stream data to obtain the gesture image data; performing gesture recognition on the gesture image data, and generating a gesture manipulation command in the case of a gesture operation; and transmitting the gesture manipulation command.

At least one embodiment of the present disclosure provides a gesture recognition system comprising the gesture recognition device as described above and a gesture recognition server, the gesture recognition server comprising a second network communication unit, a video decoding unit, and a gesture recognition unit. The second network communication unit is configured to receive video stream data comprising gesture image data and to transmit a gesture manipulation command; the video decoding unit is configured to decode the video stream data to obtain the gesture image data; and the gesture recognition unit is configured to perform gesture recognition on the gesture image data and generate a gesture manipulation command in the case of a gesture operation.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms used herein should have the same meaning as commonly understood by one of ordinary skill in the art. The terms "first", "second" and similar words used in the present disclosure do not denote any order, quantity, or importance, but are merely intended to distinguish different components. Similarly, the words "a", "an", "the" signify the presence of at least one element or at least one article, rather than a limit to quantity. Words like "comprising" or "comprising" and etc. mean that an element or an article before them contains an element/elements or an article/articles listed thereafter, while not excluding other elements or articles. Words such as "connect" or "couple" or the like are not to be limited to physical or mechanical connections, but can comprise electrical connections, either direct or indirect. Terms of "up", "down", "left", "right" and etc. are merely intended to indicate relative positional relationships, and if the absolute position of the described object is changed, the relative positional relationship will be changed accordingly.

At least one embodiment of the present disclosure provides a gesture recognition device comprising an image acquisition unit, a video encoding unit, a first network communication unit, and an instruction execution unit. The image acquisition unit is configured to acquire gesture image data; the video encoding unit is configured to encode the gesture image data to form video stream data; the first network communication unit is configured to transmit the video stream data and receive a gesture manipulation command; and the instruction execution unit is configured to perform a corresponding control operation in accordance with the gesture manipulation command. The gesture manipulation command performs a corresponding control operation according to the gesture manipulation command. At least one embodiment of the present disclosure also provides a gesture recognition server, a gesture recognition system, and a gesture recognition method.

The gesture recognition device, the gesture recognition server, the gesture recognition system, and the gesture recognition method according to the embodiments of the present disclosure can meet the requirement of real-time interaction in a case where the gesture recognition device does not have high-performance computing capability.

The embodiments of the present disclosure will be described in detail hereinafter with reference to the accompanying drawings.

Figure 1:
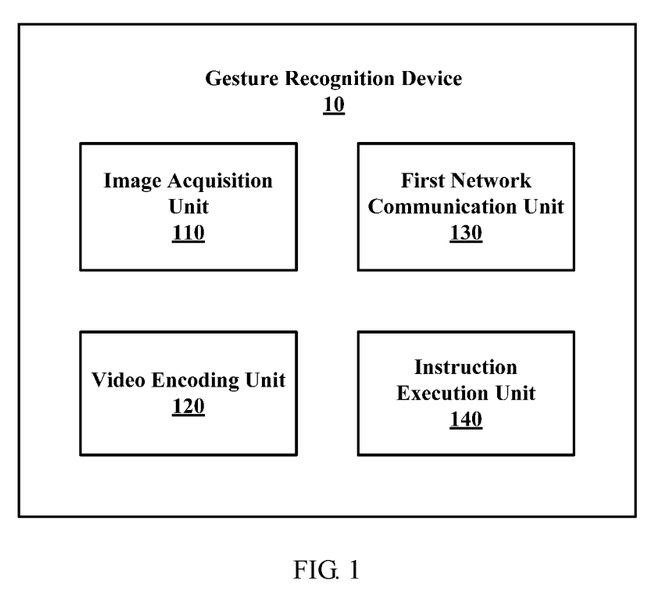
FIG. 1 is a schematic view of a gesture recognition device according to an example of an embodiment of the present disclosure.

One example of an embodiment of the present disclosure provides a gesture recognition device 10, as illustrated in FIG. 1, the gesture recognition device 10 comprises an image acquisition unit 110, a video encoding unit 120, a first network communication unit 130, and an instruction execution unit 140.

For example, the image acquisition unit 110 can be configured to acquire gesture image data. For example, in some embodiments of the present disclosure, the image acquisition unit 110 can be implemented as a camera, for example, examples of which can comprise an RGB (red, green, blue color mode) camera or a depth camera. For example, the RGB camera can capture gesture image data comprising skin color information or capture gesture image data comprising grayscale images; for example, the depth camera can capture gesture image data comprising depth information. It should be noted that the embodiment of the present disclosure does not limit the type of the camera to be used, as long as the function of capturing the gesture image of the user can be implemented. In addition, in an embodiment of the present disclosure, the image acquisition unit 110 (for example, a camera) can be built in the gesture recognition device 10, or can be disposed outside the gesture recognition device 10 and connected to the gesture recognition device 10 through a certain interface (for example, USB, etc.) The interface is not limited in the embodiment of the present disclosure.

For example, the video encoding unit 120 can be configured to encode the gesture image data to form video stream data. For example, when the user performs the gesture operation, the image acquisition unit 110 can acquire multiple frame gesture image data according to a certain frame rate (for example, 30 frames/second, etc.), and the video encoding unit 120 can encode the multiple frame gesture image data so as to form video stream data. Of course, the user can also make a static gesture action, and the successive multi-frame gesture image data collected by the image acquisition unit 110 can be the same.

For example, when the gesture recognition device 10 is integrated in a computer, a television set or a digital set-top box, the video encoding unit 120 can be implemented through hardware with video encoding function existing in the television set or the digital set-top box, in which case the video encoding unit 120 has a hardware encoding function. Also for example, the video encoding unit 120 can comprise at least one processor and at least one memory. The memory is configured to store computer instructions suitable for execution by the processor, and the computer instructions can encode the gesture image data to form video stream data when executed by the processor. In this case, the video encoding unit 120 has a software encoding function.

It should be noted that the video encoding unit 120 can have both a hardware encoding function and a software encoding function at the same time, which is not limited by the embodiment of the present disclosure. For example, in a case where the video encoding unit 120 has both a hardware encoding function and a software encoding function at the same time, hardware encoding can be employed first, which can increase the speed of encoding, thereby improving the real-time performance of the gesture recognition device 10.

For example, when the video encoding unit 120 encoding, the encoding type used can comprise encoding types such as H.264 and H.265, and other encoding types can also be utilized. Both H.264 and H.265 are existing coding types and will not be described here.

For example, the first network communication unit 130 can be configured to transmit video stream data and receive gesture manipulation commands. For example, the first network communication unit 130 can transmit video stream data and receive gesture manipulation commands over a network, such as a wired network or a wireless network. For example, in some embodiments of the present disclosure, the first network communication unit 130 can be implemented as a modem, a wired network card, a wireless network card, etc., for example, the wireless network card can be interconnected with a wireless router, and the wireless router can be interconnected to a cloud server (for example, a gesture recognition server), and in turn, communication between the gesture recognition device 10 and the cloud server is enabled. Communication manner of the first network communication unit 130 is not limited in the embodiments of the present disclosure, as long as the communication between the first network communication unit 130 and the cloud server is enabled.

For example, the instruction execution unit 140 can be configured to perform a corresponding control operation in accordance with the gesture manipulation command. For example, the gesture manipulation command can be a gesture manipulation command returned by the gesture recognition server after the video stream data is subjected to gesture recognition processing by the gesture recognition server. For example, after the first network communication unit 130 receives a gesture manipulation command through the network, the instruction execution unit 140 can perform a corresponding control operation according to the gesture manipulation command, such as a control operation of pause, play, mute, and etc., or a control operation of advance, back and etc. For example, each gesture manipulation command can be separately provided with a corresponding value, for example, a gesture value. For example, a gesture value corresponding to the gesture control command of pause can be set as 1, the gesture value corresponding to the gesture manipulation command of play is set as 2, and the gesture value corresponding to the gesture manipulation command of mute is set as 3, etc., so as to be transmitted through the network. Then, only the corresponding gesture value needs to be transmitted over the network when the gesture manipulation command is transmitted. With this configuration, the amount of data transmitted can be reduced, and it is more convenient for the instruction execution unit 140 to check out the gesture manipulation command and execute it.

For example, in some embodiments of the present disclosure, similar to the video encoding unit 120, the instruction execution unit 140 can also be implemented as at least one processor and at least one memory. The at least one memory is configured to store computer instructions suitable for execution by the at least one processor, and the computer instructions, when executed by the at least one processor, can be implemented to perform corresponding control operations in accordance with the gesture manipulation commands. It should be noted that the instruction execution unit 140 and the video encoding unit 120 can be implemented through the same processor and the same memory. For example, a correspondence table between a plurality of gesture manipulation commands and a plurality of gesture values can be stored in the at least one memory, and the instruction execution unit 140 can obtain a gesture manipulation command corresponding to a certain gesture value through looking up the table.

Without a high-performance computing capability, the gesture recognition device 10 according to the embodiment of the present disclosure can encode the acquired gesture image data so as to obtain video stream data and transmit the video stream data to the gesture recognition server, to perform gesture recognition on the video stream data in the gesture recognition server, which has a high-performance computing capability. After receiving the gesture manipulation command obtained by gesture recognition process, the gesture recognition device 10 performs a corresponding control operation to complete the real-time interaction. The gesture recognition device 10 can meet the requirements for real-time interaction without high-performance computing capabilities.

Figure 2:
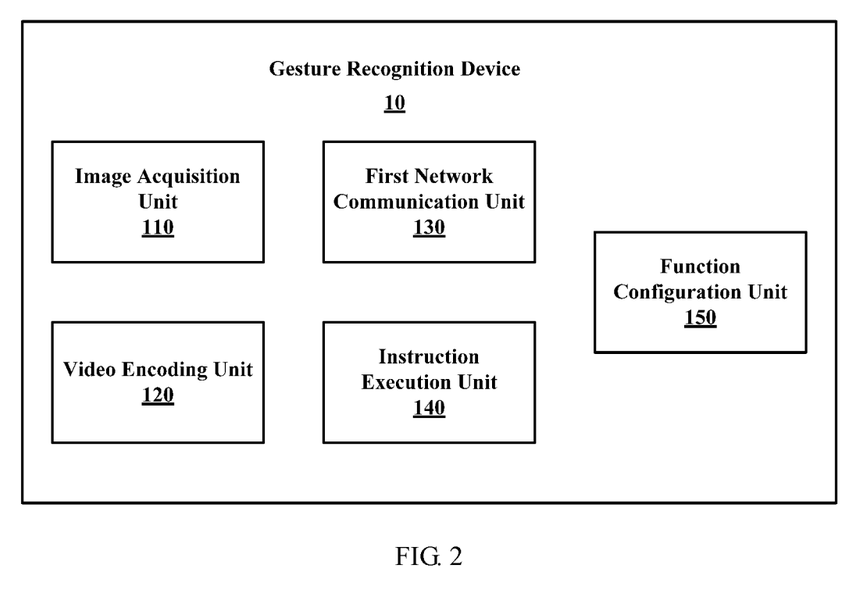
FIG. 2 is a schematic view of a gesture recognition device according to another example of an embodiment of the present disclosure.

For example, as illustrated in FIG. 2, in one example of an embodiment of the present disclosure, the gesture recognition device 10 can further comprise a function configuration unit 150.

For example, as illustrated in FIG. 2, in the case of comprising the function configuration unit 150, the first network communication unit 130 can be further configured to transmit configuration information of the gesture recognition device 10 to the gesture recognition server and receive a configuration command from the gesture recognition server.

For example, at the starting of working of the gesture recognition device 10, the configuration information of the gesture recognition device 10 can be transmitted to the gesture recognition server through the first network communication unit 130. For example, the configuration information comprises whether the video encoding unit 120 supports image pre-processing; and comprises other configuration information of the image capturing unit 110, for example, supporting grayscale images or not, supporting depth or not, supporting RGB data or not, supporting focus adjustment or not, supporting camera rotation or not, and the like.

For example, after receiving the configuration information, the gesture recognition server can select a corresponding gesture recognition algorithm according to the configuration information, generate a configuration command according to the selected gesture recognition algorithm, and return the configuration command, and the first network communication unit 130 can receive the configuration command.

For example, the function configuration unit 150 can be configured to set the gesture recognition device 10 according to the configuration command. For example, the configuration command comprises a configuration command for the image acquisition unit 110 to acquire a type of image type (e.g., a depth image, a grayscale image, or an RGB image); and for example again, the configuration command can further comprise a default frame rate and a default resolution for the image acquisition unit 110 to acquire gesture image data. And for example again, the configuration command can further comprise a configuration command for setting a push stream address, which is a network address to which the first network communication unit 130 sends the video stream data. It should be noted that the foregoing push flow address can be a constant address or a variable address, which is not limited in the embodiment of the present disclosure. When the variable address is adopted, security and concealment of data transmission can be improved.

For example, in one example of an embodiment of the present disclosure, the video encoding unit 120 can be further configured to perform image pre-processing on the gesture image data. For example, the image pre-processing comprises extracting a hand region from the gesture image data. For example, if a size of the gesture image data acquired by the image acquisition unit 110 is 640×480 and a size of the hand region is 320×240, the video encoding unit 120 can first extract the hand region where the hand is located and then encode the hand region. In this way, the size of the video stream data can be reduced so as to improve the transmission efficiency.

For example, in one example of an embodiment of the present disclosure, the video encoding unit 120 can be further configured to dynamically adjust image pre-processing according to a configuration command. For example, when the gesture recognition server performs gesture recognition on the video stream data, the hand can tracked and tracks of the hand can be predicted based on a multi-frame tracking result, thereby adjusting coordinates of the hand center position and the side of the hand region. The gesture recognition server can set the coordinates of the hand center position and the size of the hand region as configuration commands and send the configuration commands to the gesture recognition device 10 in real time, and the video encoding unit 120 can dynamically adjust the position and size of the extracted region according to the configuration commands when performing the image preprocessing. It should be noted that the coordinates of hand center position herein signify the coordinates of the hand center in the gesture image data, and it is the same in the following embodiments, and will not be elaborated.

For example, each frame of gesture image data after image pre-processing (for example, hand region extraction) can be referred to as video frame data, and a plurality of video frame data can be encoded to form video stream data. The coordinates of hand center position can be calculated by recording the position coordinates of the video frame data in the corresponding gesture image data and the position coordinates of the hand center in the video frame data.

The following example illustrates how to get coordinates of the hand center. Still as described above, the image acquisition unit 110 acquires a gesture image data with a size of 640×480, and a size of the hand region is, for example, 320×240, and the hand region is extracted and encoded to form video frame data. When the gesture recognition server performs gesture recognition on the video frame data, for example, the position coordinates of the hand center in the video frame data are (1, 2), that is, the position coordinates in the hand region, and for example, the coordinates of the upper left point of the hand region with a size of 320×240 in the corresponding gesture image data with a size of 640×480 are (100, 101), and then, the coordinates of the hand center position in the gesture image data can be determined as (101, 103) through calculation.

It should be noted that embodiments of the present disclosure comprise, but are not limited to, the manner in which the coordinates of the hand center position are obtained as described above.

For example, in one example of an embodiment of the present disclosure, the image acquisition unit 110 can be further configured to dynamically adjust a frame rate of the acquired gesture image data according to the configuration command. For example, when the gesture recognition server perform gesture recognition on the video stream data, if the hand contour is not detected continuously for a certain period of time (for example, 3 seconds, 5 seconds, etc.), the gesture recognition server can transmit a configuration command to the image acquisition unit 110 and the image acquisition can lower the frame rate of acquiring gesture image data according to the configuration command, for example, from 30 frames/second to 10 frames/second or 1 frame/second. If the hand contour is detected again, the frame rate of acquiring gesture image data is restored, for example, to 30 frames/sec. In this manner, computing resources and communication resources (e.g., network bandwidth) of the gesture recognition device 10 and the gesture recognition server can be saved.

Figure 3:
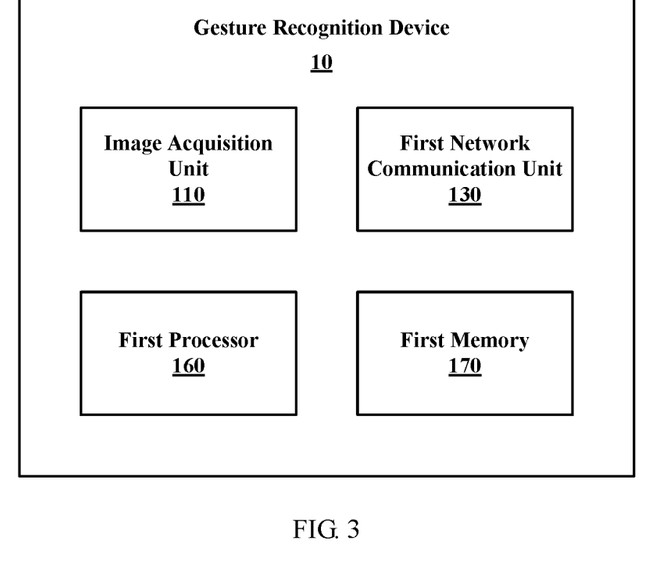
FIG. 3 is a schematic view of a gesture recognition device according to an embodiment of the present disclosure.

An embodiment of the present disclosure further provides a gesture recognition device 10, as illustrated in FIG. 3, the gesture recognition device 10 comprises an image acquisition unit 110, a first network communication unit 130, at least one first processor 160, and at least one first memory 170.

For example, the image acquisition unit 110 is configured to acquire gesture image data.

For example, the first network communication unit 130 is configured to transmit video stream data comprising gesture image data and receive a gesture manipulation command.

Regarding the image acquisition unit 110 and the first network communication unit 130, reference can be made to the corresponding description in the above embodiments, and details will not described herein again.

For example, the first memory 170 is configured to store computer instructions that are adaptable for execution by the first processor 160, and the computer instructions performs the following operations when being executed by the first processor 160:

Encoding the gesture image data to form video stream data; and performing a corresponding control operation in accordance with the gesture manipulation command.

Figure 4:
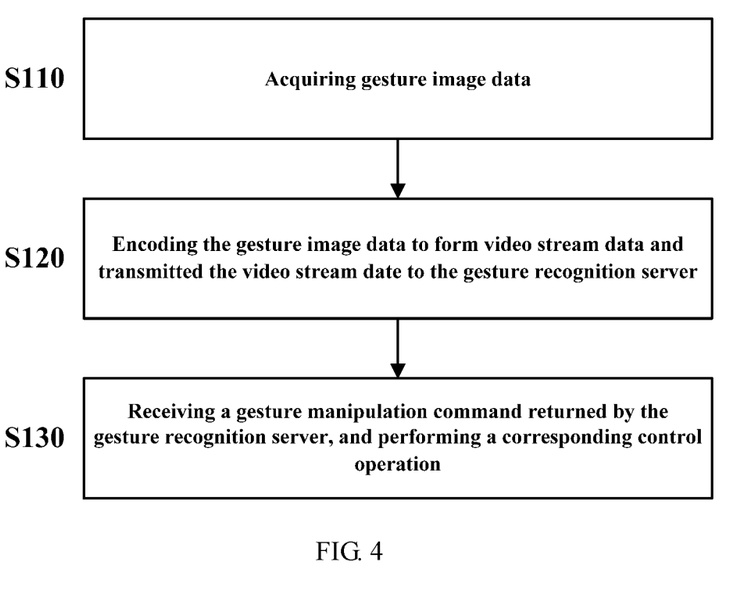
FIG. 4 is a schematic view of a gesture recognition method according to an example of an embodiment of the present disclosure.

An embodiment of the present disclosure further provides a gesture recognition method. As illustrated in FIG. 4, the gesture recognition method comprises:

Step S110, acquiring gesture image data;

Step S120, encoding the gesture image data to form video stream data and transmitted the video stream data to the gesture recognition server; and Step S130, receiving a gesture manipulation command returned by the gesture recognition server, and performing a control operation corresponding to the gesture manipulation command.

For example, as illustrated in FIG. 2, step S110 can be performed by the image acquisition unit 110 to obtain gesture image data. For example, step S120 can be performed on the gesture image data obtained in step S110 by the video encoding unit 120, that is, the gesture image data is encoded to form video stream data, and transmitted to the gesture recognition server. The video stream data can be transmitted to the gesture recognition server, for example, by the first network communication unit 130 as illustrated in FIG. 2.

In step S130, similarly, the gesture manipulation command returned by the gesture recognition server can be received by the first network communication unit 130 illustrated in FIG. 2, and then the control operation corresponding to the gesture manipulation command can be executed by the instruction execution unit 140 illustrated in FIG. 2.

It should be noted that the descriptions of the image capturing unit 110, the video encoding unit 120, the first network communication unit 130, and the instruction execution unit 140 can refer to the corresponding descriptions in the foregoing embodiments of the gesture recognition device 10, and details thereof will not be elaborated here.

The gesture recognition method provided by the embodiment of the present disclosure can encode the acquired gesture recognition image so as to form video stream data and send the video stream data to the gesture recognition server in the case that the gesture recognition device 10 does not have high-performance computing capability, such that gesture recognition processing is performed in a gesture recognition server with more computing power. After receiving the gesture manipulation command obtained by the gesture recognition process, the gesture recognition device 10 performs a control operation corresponding to the gesture manipulation command to complete the real-time interaction. The gesture recognition method can satisfy the requirement of real-time interaction even in the case where the gesture recognition device 10 does not have high-performance computing capabilities.

Figure 5:
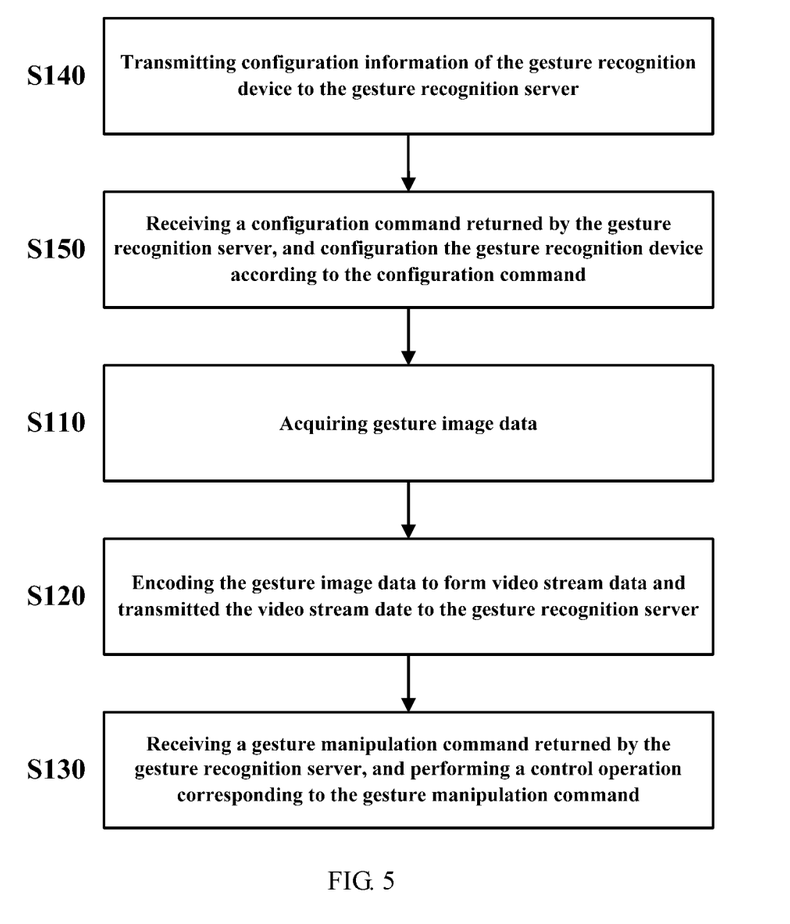
FIG. 5 is a schematic view of a gesture recognition method according to another example of an embodiment of the present disclosure.

In an example of an embodiment of the present disclosure, as illustrated in FIG. 5, the gesture recognition method illustrated in FIG. 4 can further comprise the following operations.

Step S140: transmitting configuration information of the gesture recognition device to the gesture recognition server; and Step S150: receiving a configuration command returned by the gesture recognition server, and configuration the gesture recognition device according to the configuration command.

For example, as illustrated in FIG. 2, in the case where the gesture recognition device 10 comprises a function configuration unit 150, when the gesture recognition device 10 begins to work, the gesture recognition device 10 can perform step S140, in which the configuration information of the gesture recognition apparatus 10 is transmitted to the gesture recognition server. For example, the configuration information comprises whether the video encoding unit 120 supports image pre-processing; and comprises configuration information of the image capturing unit 110, for example, supporting grayscale images or not, supporting depth or RGB data or not, supporting focus adjustment or not, supporting camera rotation or not, and the like.

For example, after receiving the configuration information, the gesture recognition server can select a corresponding gesture recognition algorithm according to the configuration information, and generate a configuration command according to the selected gesture recognition algorithm and return the configuration command to the configuration command. In step S150, the configuration command can be received by the first network communication unit 130 as illustrated in FIG. 2, and the gesture recognition device 10 can be configured by the function configuration unit as illustrated in FIG. 2 according to the configuration command.

Figure 6:
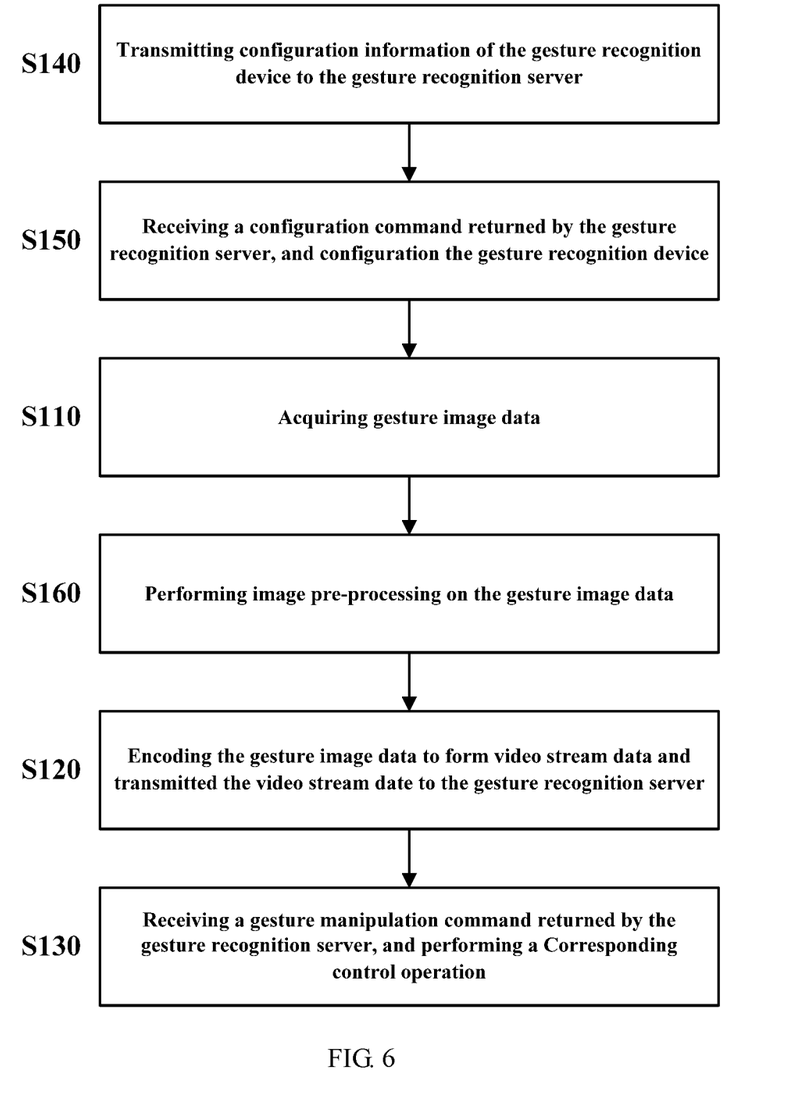
FIG. 6 is a schematic view of a gesture recognition method according to still another example in an embodiment of the present disclosure.

In an example of an embodiment of the present disclosure, as illustrated in FIG. 6, the gesture recognition method illustrated in FIG. 5 can further comprising the following operations:

Step S160: performing image pre-processing on the gesture image data.

For example, Step S160 can be performed prior to step S120, that is, image pre-processing is performed on the gesture image data prior to encoding the gesture image data. For example, step S160 can be performed by the video encoding unit 120 as illustrated in FIG. 2.

For example, in one example, image pre-processing on the gesture image data in step S160 can comprise hand region extraction from the gesture image data. For example, if a size of the gesture image data acquired by the image acquisition unit 110 is 640×480 and a size of the hand region is 320×240, the video encoding unit 120 can first extract the hand region where the hand is located and then encode the hand region. In this way, the size of the video stream data can be reduced thereby improving the transmission efficiency.

For example, in one example of an embodiment of the present disclosure, the video encoding unit 120 illustrated in FIG. 2 can dynamically adjust the pre-processing on the gesture image data according to a configuration command when performing step S160. For example, when the gesture recognition server performs gesture recognition on the video stream data, the hand can tracked and the tracks of the hand can be predicted based on the multi-frame tracking result, thereby adjusting coordinates of the hand center position and the size of hand region. The gesture recognition server can set the coordinates of hand center position and the size of hand region as configuration commands and send the configuration commands to the gesture recognition device 10 in real time, and the video encoding unit 120 can dynamically adjust the coordinates of the hand center position and the size of the hand region according to the configuration commands when performing the image pre-processing.

It should be noted that, regarding the coordinates of hand center position, reference can be made to the corresponding description in the foregoing embodiment of the gesture recognition device 10, and details will not elaborated here.

For example, in an example of the embodiment of the present disclosure, when the image capturing unit 110 illustrated in FIG. 2 performs step S110, a frame rate of acquiring gesture image data can be dynamically adjusted according to the configuration command. For example, when the gesture recognition server performing gesture recognition on the video stream data, if the hand contour is not detected continuously for a certain period (for example, 3 seconds, 5 seconds, etc.), the gesture recognition device 10 can send a configuration command to the image acquisition unit 110 and the image acquisition unit 110 lower the frame rate of acquiring gesture image data according to the configuration command, for example, from 30 frames/second to 10 frames/second or 1 frame/second. If the hand contour is detected again, the frame rate of acquiring gesture image data is restored, for example, to 30 frames/second. In this manner, computing resources and communication resources (e.g., network bandwidth) of the gesture recognition device 10 and the gesture recognition server can be saved.

Figure 7:
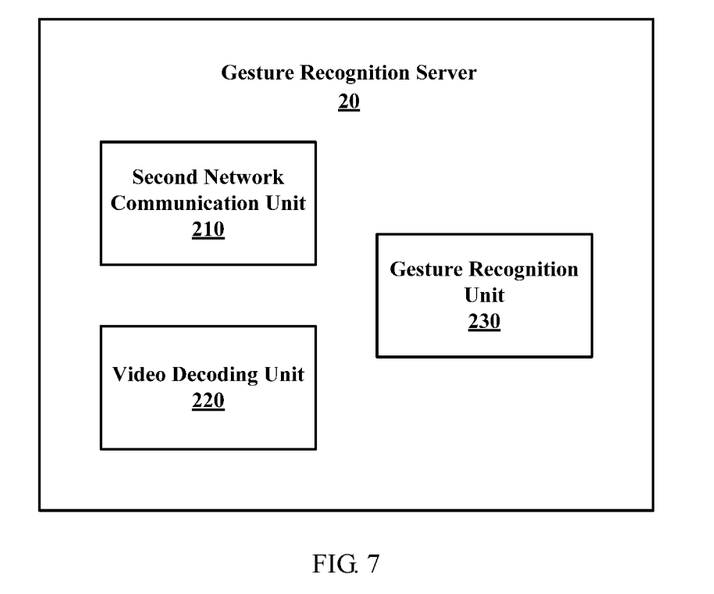
FIG. 7 is a schematic view of a gesture recognition server according to an example of an embodiment of the present disclosure.

One embodiment of the present disclosure further provides a gesture recognition server 20 which comprises a second network communication unit 210, a video decoding unit 220, and a gesture recognition unit 230, as illustrated in FIG. 7.

For example, the second network communication unit 210 can be configured to receive video stream data comprising gesture image data and to transmit a gesture manipulation command. For example, the second network communication unit 210 can receive video stream data transmitted by the gesture recognition device 10, and the video stream data is obtained, for example, through pre-processing and encoding the gesture image data by the gesture recognition device 10. That is, the video stream data comprises gesture image data.

For example, the second network communication unit 210 can receive video stream data and send gesture manipulation commands over a network, such as a wired network or a wireless network. For example, in some embodiments of the present disclosure, the second network communication unit 210 can be implemented as a modem, a wired network card, a wireless network card. For example, the wireless network card can be interconnected with a wireless router, and the wireless router can be interconnected with the gesture recognition device 10, thereby enabling communication between the gesture recognition server 20 and the gesture recognition device 10. The embodiment of the present disclosure does not limit the communication manner of the second network communication unit 210, as long as the communication function between the second network communication unit and the gesture recognition device 10 can be enabled.

For example, the video decoding unit 220 can be configured to decode the video stream data to obtain gesture image data. For example, the gesture image data obtained by decoding can be provided to the gesture recognition unit 230 for gesture recognition. For example, the video decoding unit 220 can comprise at least one processor and at least one memory. The at least one memory is configured to store computer instructions suitable for execution by the at least one processor, and the computer instructions can decode the video stream data to obtain gesture image data when executed by the processor.

It should be noted that, if the gesture recognition device 10 performs image pre-processing (for example, hand region extraction) on gesture image data before encoding the gesture image data, what is obtained through decoding the video stream data by the video decoding unit 220 is pre-processed gesture image data, video frame data.

For example, the gesture recognition unit 230 can be configured to perform gesture recognition on the gesture image data obtained by the video decoding unit 220 and generate a gesture manipulation command in the case of a gesture operation. For example, the gesture recognition unit 230 can comprise various gesture recognition algorithms, such as a skin color recognition algorithm, a grayscale image recognition algorithm, and a depth image recognition algorithm, etc., and the gesture recognition unit 230 can perform gesture recognition on the gesture image data through a gesture recognition algorithm.

For example, the gesture manipulation command generated by the gesture recognition unit 230 can be transmitted to the gesture recognition device 10 through the second network communication unit 210, and the gesture recognition device 10 can perform corresponding control operations according to the gesture manipulation command, such as pause, play, mute, and the like. Control operations, such as control operations such as forward and backward in the game. For example, each gesture manipulation command can be separately provided with a corresponding value, for example, a gesture value. For example, the gesture value corresponding to the gesture control command of pause can be set as 1, the gesture value corresponding to the gesture manipulation command of play is set as 2, and the gesture value corresponding to the gesture manipulation command of mute is set as 3, etc., so that only the corresponding gesture value is required to be transmitted through the network when transmitting the gesture manipulation commands. With this configuration, the amount of data transmitted can be reduced, and it is easy for the gesture recognition device 10 to judge and process.

For example, in some embodiments of the present disclosure, similar to the video decoding unit 220, the gesture recognition unit 230 can also be implemented as at least one processor and at least one memory. The at least one memory is configured to store computer instructions suitable for execution by the at least one process. And the computer instructions, when executed by the processor, can perform operations of gesture recognition on gesture image data and generating gesture manipulation commands in the presence of gesture operations. It should be noted that the gesture recognition unit 230 and the video decoding unit 220 can be implemented by the same processor and memory. For example, a correspondence table between the plurality of gesture operation actions and the gesture values can be stored in the memory. The gesture recognition unit 230 can generate a gesture value corresponding to a certain gesture operation action, that is, a gesture manipulation command, by performing a table lookup.

In the gesture recognition server 20 according to the embodiment of the present disclosure, the gesture recognition can be performed in the gesture recognition server 20 in a situation where the gesture recognition device 10 does not have high-performance computing capability, so as to meet the requirements of real-time interaction.

Figure 8:
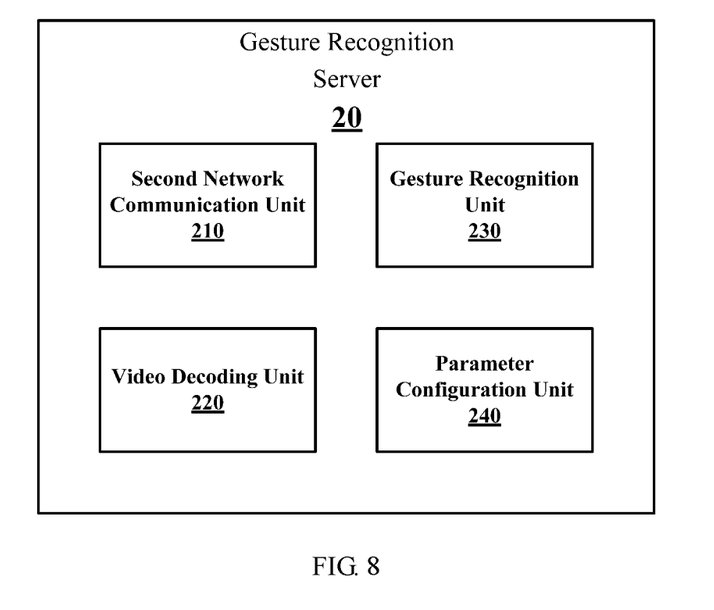
FIG. 8 is a schematic view of a gesture recognition server according to another example in an embodiment of the present disclosure.

For example, as illustrated in FIG. 8, in one example of an embodiment of the present disclosure, the gesture recognition server 20 can further comprise a parameter configuration unit 240.

For example, as illustrated in FIG. 8, in the case that the gesture recognition server comprises a parameter configuration unit 240, the second network communication unit 210 can be further configured to receive configuration information and to transmit a configuration command.

For example, the above configuration information is the configuration information of the gesture recognition device 10, and when the gesture recognition device 10 illustrated in FIG. 2 begins to work, the configuration information of the gesture recognition device 10 can be transmitted to the gesture recognition server 20.

For example, the second network communication unit 210 is configured to receive the configuration information, and the gesture recognition unit 230 can be further configured to select a gesture recognition algorithm according to the configuration information. For example, when the gesture recognition device 10 adopts an RGB camera, the corresponding gesture recognition algorithm can be a skin color recognition algorithm or a gray image recognition algorithm; for example, when the gesture recognition device 10 adopts a depth camera, the corresponding gesture recognition algorithm can be a depth image recognition algorithm. For example, the parameter configuration unit 240 can also be configured to generate a configuration command in accordance with a gesture recognition algorithm. For example, the configuration command can be transmitted to the gesture recognition device 10 through the second network communication unit 210.

For example, when the grayscale image recognition algorithm is employed, the configuration command generated by the parameter configuration unit 240 comprises a configuration command for configuring the gesture recognition device 10 to acquire the grayscale image; and, for example again, when the depth image recognition algorithm is employed, the configuration command generated by the parameter configuration unit 240 comprises a configuration command for configuring the gesture recognition device 10 to acquire a depth image.

For example, the configuration command generated by the parameter configuration unit 240 can further comprise a configuration command of default frame rate and resolution for the gesture recognition device 10 to acquire gesture image data; for example again, the configuration command generated by the parameter configuration unit 240 is further comprises a configuration command for setting a push stream address, which is a network address to which the gesture recognition device 10 transmits the video stream data.

For example, in one example of an embodiment of the present disclosure, the parameter configuration unit 240 can be further configured to generate a configuration command according to the gesture recognition result of the gesture recognition unit 230.

For example, in one example, the configuration command described above comprises a configuration command which dynamically adjusts a frame rate and is generated according to a gesture recognition result of the gesture recognition unit 230. For example, after the configuration command is transmitted to the gesture recognition device 10, the image acquisition unit 110 can dynamically adjust the frame rate for acquiring gesture image data according to the configuration command. For example, when the gesture recognition unit 230 performs gesture recognition on the gesture image data, if the hand contour is not detected continuously for a certain period (for example, 3 seconds, 5 seconds, etc.), the gesture recognition unit 230 can send a configuration command to the gesture recognition device 10. The image acquisition unit 110 can reduce the frame rate for acquiring gesture image data according to the configuration command, for example, from 30 frames/second to 10 frames/second or 1 frame/second; if the gesture recognition unit 230 detects the hand contour again, the frame rate for acquiring gesture image data is restored, for example, the frame rate is restored to 30 frames/second. In this manner, computing resources and communication resources (e.g., network bandwidth) of gesture recognition device 10 and gesture recognition server 20 can be saved.

For example, in one example of an embodiment of the present disclosure, the gesture recognition unit 230 can be further configured to predict a motion trajectory of the hand based on the gesture recognition result. It should be noted that the motion trajectory of the hand indicates that a motion trajectory formed by the coordinates of the hand center position that continuously changes, and the following embodiments are the same as those described herein, and will not be elaborated.

For example, when the gesture recognition unit 230 performs gesture recognition on the gesture image data, the gesture recognition unit 230 can track the hand and predict the motion trajectory of the hand based the multi-frame tracking result, thereby adjusting the coordinates of hand center position and the size of hand region. The gesture recognition server 20 can send the coordinates of hand center position and the size of hand region as configuration commands to the gesture recognition device 10 in real time, and the video encoding unit 120 can dynamically adjust the position and the size of the extracted region according to the configuration commands when performing image preprocessing.

It should be noted that, regarding the coordinates of hand center position, reference can be made to the corresponding description in the foregoing embodiment of the gesture recognition device 10, and details will not described herein again.

Figure 9:
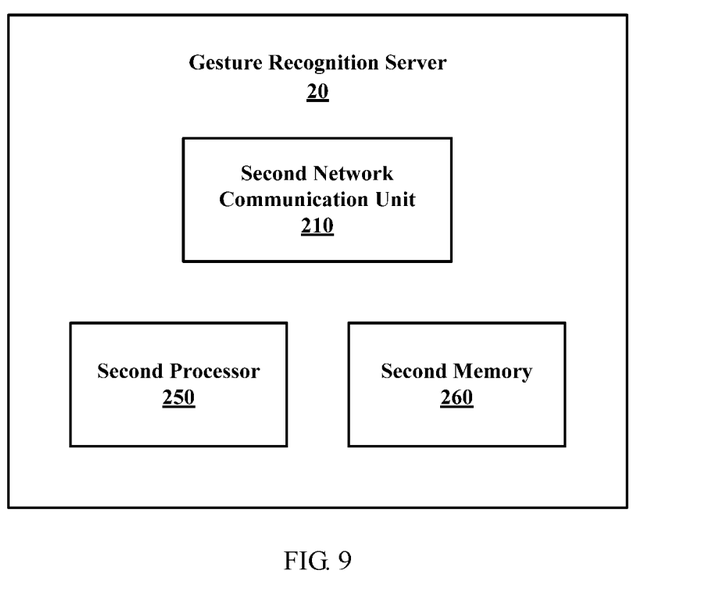
FIG. 9 is a schematic view of a gesture recognition server according to an embodiment of the present disclosure.

One embodiment of the present disclosure also provides a gesture recognition server 20, as illustrated in FIG. 9, the gesture recognition server 20 comprises a second network communication unit 210, at least one second processor 250, and at least one second memory 260. For example, the at least one second processors 250 can be arranged in the form of a processor cluster or the like, such as a distributed splicing processor; the at least one second memories 260 can be arranged in a variety of forms such as distributed memory, memory pools, memory arrays, and the like.

For example, the second network communication unit 210 is configured to receive video stream data comprising gesture image data and to transmit a gesture manipulation command. Regarding the second network communication unit 210, reference can be made to the corresponding description in the foregoing embodiment, and details are not described herein again.

For example, the second memory 260 is configured to store computer instructions that are suitable for execution by the second processor 250, and when the computer instructions are executed by the second processor 250, the following operations are performed: decoding video stream data to obtain gesture image data; performing gesture recognition on the gesture image data, and generating a gesture manipulation in the case of a gesture operation.

Figure 10:
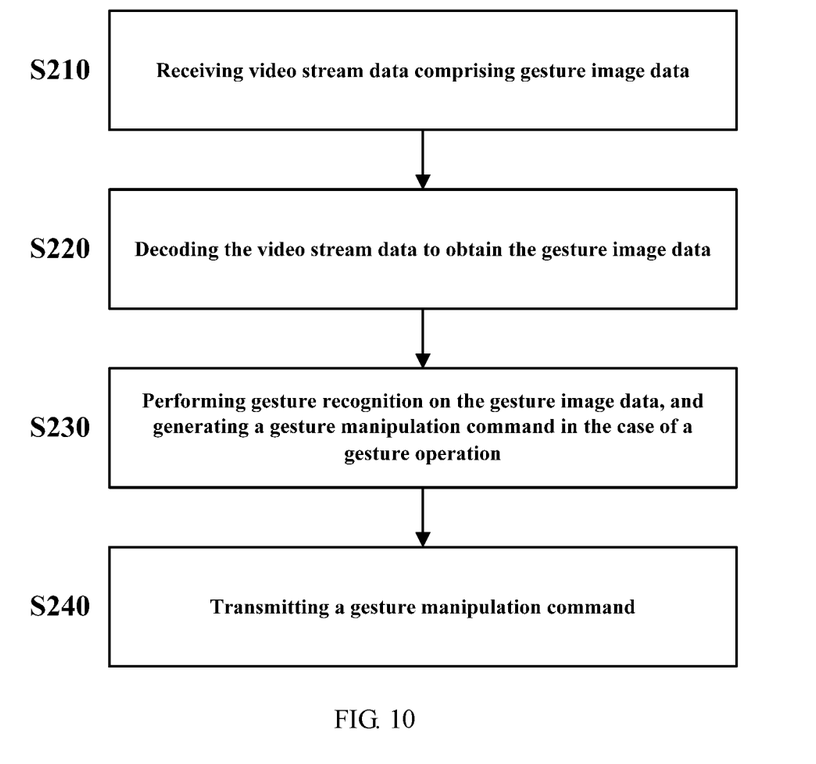
FIG. 10 is a schematic view of a gesture recognition method according to an example of an embodiment of the present disclosure.

An embodiment of the present disclosure further provides a gesture recognition method. As illustrated in FIG. 10, the gesture recognition method comprises the following operations.

Step S210: Receiving video stream data comprising gesture image data;

Step S220: Decoding the video stream data to obtain the gesture image data;

Step S230: performing gesture recognition on the gesture image data, and generating a gesture manipulation command in the case of a gesture operation; and Step S240: Transmitting a gesture manipulation command.

For example, as illustrated in FIG. 8, the second network communication unit 210 can be employed to perform step S210 to receive video stream data comprising gesture image data. For example, the video stream data can be obtained through pre-processing and encoding the gesture image data by the gesture recognition device 10, that is, the video stream data comprises gesture image data.

For example, as illustrated in FIG. 8, the video decoding unit 220 can be adopted to perform step S220, and the video stream data obtained in step S210 is decoded to obtain gesture image data.

For example, as illustrated in FIG. 8, the gesture recognition unit 230 can be adopted to perform step S230, perform gesture recognition on the gesture image data obtained by decoding in step S220, and generate a gesture manipulation command in the case of a gesture operation.

In step S240, similarly, the gesture manipulation command generated in step S230 can be transmitted through the second network communication unit 210 as illustrated in FIG. 8. For example, the gesture manipulation command can be transmitted to the gesture recognition device 10, and the gesture recognition device 10 can perform corresponding control operations, such as pause, play, mute, and the like, according to the gesture manipulation command.

It should be noted that descriptions about the second network communication unit 210, the video decoding unit 220, and the gesture recognition unit 230 can refer to the corresponding descriptions in the foregoing embodiment of the gesture recognition server 20, and details will not be described herein again.

The gesture recognition method according to the embodiment of the present disclosure can perform gesture recognition processing in the gesture recognition server 20 in a case where the gesture recognition device 10 does not have high-performance computing capability so as to meet the requirements of real-time interaction.

Figure 11:
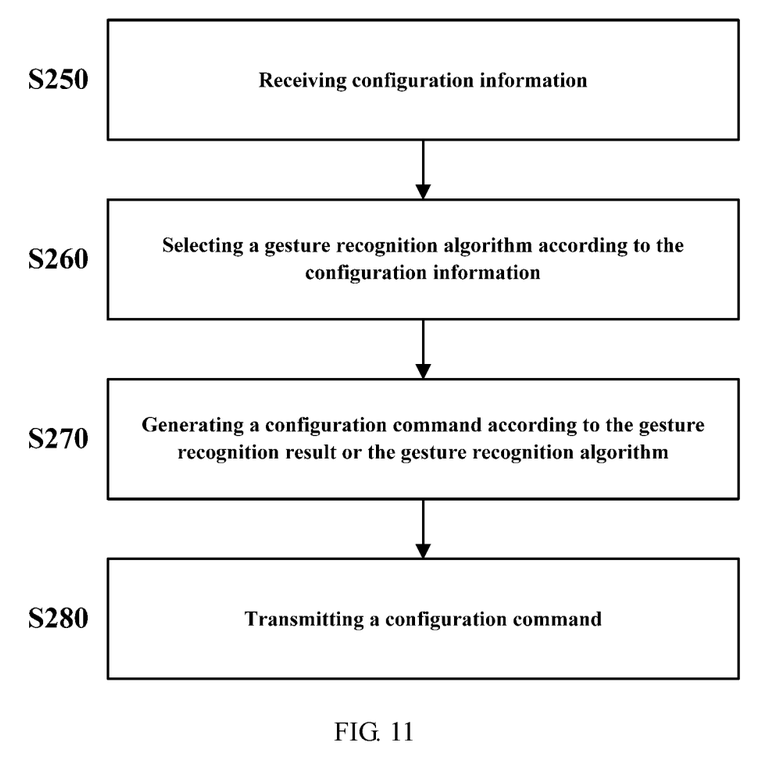
FIG. 11 is a schematic view of a gesture recognition method according to another example in an embodiment of the present disclosure.

In an example of an embodiment of the present disclosure, as illustrated in FIG. 11, the gesture recognition method illustrated in FIG. 10 can further comprise the following operations:

Step S250: Receiving configuration information.

Step S260: Selecting a gesture recognition algorithm according to the configuration information;

Step S270: generating a configuration command according to the gesture recognition result or the gesture recognition algorithm; and Step S280: transmitting a configuration command.

For example, as illustrated in FIG. 8, in a case where the gesture recognition server 20 comprises the parameter configuration unit 240, the second network communication unit 210 can also be adopted to perform step S250 to receive configuration information. For example, the above configuration information is configuration information of the gesture recognition device 10, and when the gesture recognition device 10 illustrated in FIG. 2 begins to work, the configuration information for the gesture recognition device 10 can be transmitted to the gesture recognition server 20.

For example, as illustrated in FIG. 8, the gesture recognition unit 230 can be adopted to perform step S260, and the gesture recognition unit 230 can select a gesture recognition algorithm according to the configuration information obtained in step S250. For example, when the gesture recognition device 10 adopts an RGB camera, the corresponding gesture recognition algorithm can adopt a skin color recognition algorithm or a gray image recognition algorithm; for example, when the gesture recognition device 10 adopts a depth camera, the corresponding gesture recognition algorithm can adopt a depth image recognition algorithm.

For example, in step S270, the parameter configuration unit 240 illustrated in FIG. 8 can be employed to generate a configuration command according to the gesture recognition algorithm selected in step S260. For example, when the grayscale image recognition algorithm is employed, the configuration command generated by the parameter configuration unit 240 comprises a configuration command for configuring the gesture recognition device 10 to acquire the grayscale image; and, for example, when the depth image recognition algorithm is employed, the configuration command generated by the parameter configuration unit 240 comprises a configuration command is configured to configure the gesture recognition device 10 to acquire a depth image.

For example, in step S270, the configuration command generated by the parameter configuration unit 240 can further comprise a configuration command of default frame rate and resolution for the gesture recognition device 10 to acquire gesture image data; for example, the configuration command generated by the parameter configuration unit 240 can further comprise a configuration command for setting a push stream address, which is a network address to which the gesture recognition device 10 transmits the video stream data.

For example, in step S270, the parameter configuration unit 240 illustrated in FIG. 8 can further be employed to generate a configuration command based on the gesture recognition result obtained in step S230.

For example, in one example, the above configuration command comprises a configuration command for dynamically adjusting a frame rate according to the gesture recognition result obtained in step S230. For example, after the configuration command is transmitted to the gesture recognition device 10, the image acquisition unit 110 can dynamically adjust the frame rate of acquiring gesture image data according to the configuration command. For example, when performing gesture recognition on the gesture image data in step S230, if the hand contour is not detected for a certain period (for example, 3 seconds, 5 seconds, etc.), a configuration command can be issued to the gesture recognition device 10, and the image acquisition unit 110 can lower the frame rate of acquiring gesture image data according to the configuration command, for example, from 30 frames/second to 10 frames/second or 1 frame/second; if the hand contour is re-detected in step S230, the frame rate of acquiring gesture image is restored, for example, back to 30 frames/second. In this manner, computing resources and communication resources (e.g., network bandwidth) of the gesture recognition device 10 and the gesture recognition server 20 can be saved.

For example, in step S280, the configuration command generated in step S270 can still be transmitted through the second network communication unit 210 illustrated in FIG. 8.

Figure 12:
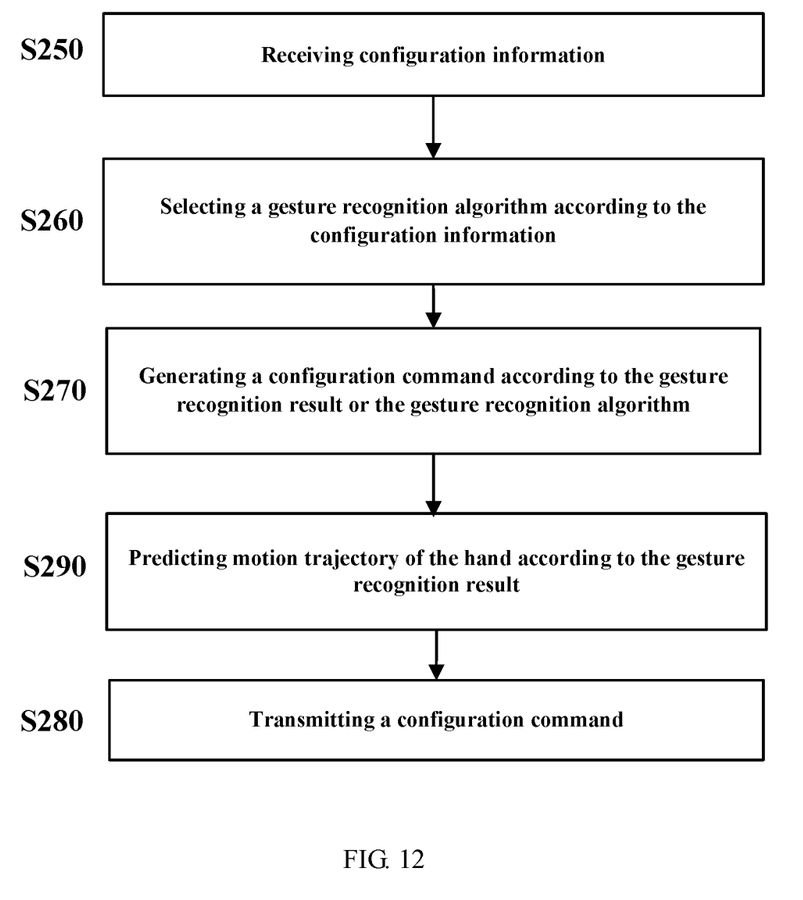
FIG. 12 is a schematic view of a gesture recognition method according to still another example in an embodiment of the present disclosure.

In an example of an embodiment of the present disclosure, as illustrated in FIG. 12, the gesture recognition method illustrated in FIG. 11 can further comprise the following operations.

Step S290: predicting motion trajectory of the hand according to the gesture recognition result.

For example, in step S230, when performing gesture recognition on the gesture image data, the gesture recognition unit 230 can track the hand and predict the motion trajectory of the hand based on the multi-frame tracking result, thereby adjusting the coordinates of hand center position and the size of hand region. The gesture recognition server 20 can send the coordinates of hand center position and the size of hand region as configuration commands to the gesture recognition device 10 in real time, and the video encoding unit 120 can dynamically adjust a position and a size of the extracted region based on the configuration commands when performing the image preprocessing.

It should be noted that, regarding the coordinates of hand center position, reference can be made to the corresponding description in the foregoing embodiment of the gesture recognition device 10, and details will be not described herein again.

In various embodiments of the present disclosure, any of the processors (comprising the first processor 160 and the second processor 250) can be implemented by an application specific integrated circuit chip. For example, the application specific integrated circuit chip can be provided on a main board. For example, the main board can also be provided with a memory and a power supply circuit, etc. The processor can also be implemented by a circuit or by software, hardware (circuit), firmware, or any combination thereof. In an embodiment of the present disclosure, the processor can comprise various computing architecture, such as Complex Instruction Set Computer (CISC) architecture, Reduced Instruction Set Computer (RISC) architecture, or an architecture that implements a combination of multiple instruction sets. In some embodiments, the processor can also be a microprocessor, such as an X86 processor or an ARM processor, or can be a digital processor (DSP) or the like.

In an embodiment of the present disclosure, the memory (comprising the first memory 170 and the second memory 260) can be provided, for example, on the above-described main board, and the memory can store instructions and/or data executed by the processor. For example, the memory can comprise one or more computer program products, which can comprise a computer readable memory of various forms, such as volatile memory and/or nonvolatile memory. The volatile memory can comprise, for example, a random access memory (RAM) and/or a cache or the like. The nonvolatile memory can comprise, for example, a read only memory (ROM), a hard disk, a flash memory, or the like. One or more computer program instructions can be stored on the computer readable memory, and the processor can execute the computer program instructions to implement a desired function (implemented by a processor) in an embodiment of the present disclosure.

Figure 13:
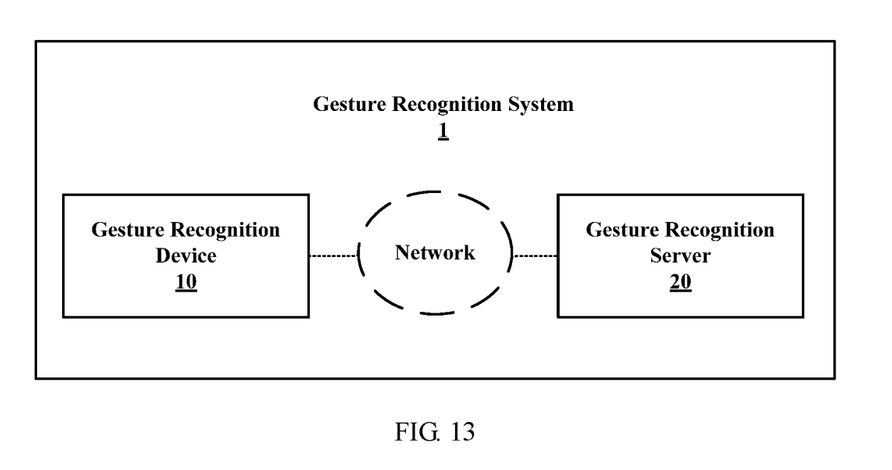
FIG. 13 is a schematic view of a gesture recognition system according to an embodiment of the present disclosure.

An embodiment of the present disclosure further provides a gesture recognition system 1, as illustrated in FIG. 13, the gesture recognition system 1 comprises any of the gesture recognition device 10 according to the embodiments of the present disclosure and any of the gesture recognition servers 20 according to the embodiments of the present disclosure.

For example, the gesture recognition device 10 and the gesture recognition server 20 can be communicated with each other via a network.

It should be noted that the network described in the embodiments of the present disclosure can be various types of communication networks, comprising but not limited to a local area network, a wide area network, and the Internet, etc. The network can be implemented as an Ethernet or a token network, FDDI (Fiber Distributed Data Interface) network, ATM (Asynchronous Transmission Mode) network, etc. The network can comprise but not limited to 3G/4G/5G mobile communication network, wireless local area network (such as WIFI), wired communication network, and the like. Correspondingly, the gesture recognition server can be implemented in various forms, and comprises a server installed in a local area network, a server installed in a wide area network, or a server installed in the Internet, such as a cloud server. In this case, the cloud service can be provided as a public cloud (provided by public cloud Vendors, typically such as Amazon, Alibaba Cloud, etc.) or can be provided as a private cloud.

The gesture recognition system 1 according to the embodiment of the present disclosure can send the captured and encoded video stream data to the gesture recognition server 20 in the case that the gesture recognition device 10 does not have high-performance computing capability, such that the gesture recognition on the video stream data can performed in a gesture recognition server 20 with more computing power. After receiving the gesture manipulation command obtained through the gesture recognition, the gesture recognition device 10 performs a corresponding control operation to achieve the real-time interaction. The gesture recognition system 1 can satisfy the requirement of real-time interaction even in the case where the gesture recognition apparatus 10 does not have high-performance computing capabilities.

For example, the gesture recognition device 10 according to the embodiments of the present disclosure can be integrated into existing electronic devices, such as computers, televisions, digital set-top boxes, and IP cameras, etc., to expand the functions and application scenarios of existing electronic devices. Of course, the gesture recognition device 10 can also be used alone, and the embodiment of the present disclosure does not limit this.

The foregoing are merely exemplary embodiments of the disclosure, but the scope of protection of the present disclosure is not limited thereto. The protection scope of the disclosure shall be defined by the attached claims.

The invention claimed is:

1. A gesture recognition device comprising:
an image acquisition unit, configured to acquire gesture image data;
a video encoding unit, configured to encode the gesture image data to form video stream data;
a first network communication unit, configured to transmit the video stream data and receive a gesture manipulation command, the first network communication unit is further configured to transmit configuration information of the gesture recognition device and to receive a configuration command; and
an instruction execution unit, configured to perform a corresponding control operation in accordance with the gesture manipulation command,
wherein the video encoding unit is further configured to perform image preprocessing on the gesture image data;
the video encoding unit is further configured to dynamically adjust the image preprocessing according to the configuration command; and
the image acquisition unit is further configured to dynamically adjust a frame rate of the gesture image data according to the configuration command.

2. The gesture recognition device according to claim 1, further comprising a function configuration unit, wherein the function configuration unit is configured to configure the gesture recognition device according to the configuration command.

3. A gesture recognition method, comprising:
acquiring gesture image data;
encoding the gesture image data to form video stream data and transmitting the video stream data to a gesture recognition server;
receiving a gesture manipulation command returned by the gesture recognition server, and performing a control operation corresponding to the gesture manipulation command,
transmitting configuration information of the gesture recognition device to the gesture recognition server;
receiving a configuration command returned by the gesture recognition server, and configuring the gesture recognition device according to the configuration command; and
performing image pre-processing on the gesture image data,
wherein the image pre-processing is dynamically adjusted according to the configuration command; and
wherein a frame rate of the acquiring gesture image data is dynamically adjusted according to the configuration command.

4. The gesture recognition method according to claim 3, wherein the image pre-processing comprises extracting a hand region from the gesture image data.

5. A gesture recognition method, comprising:
receiving video stream data comprising gesture image data;
decoding the video stream data to obtain the gesture image data;
performing gesture recognition on the gesture image data, and generating a gesture manipulation command in the case of a gesture operation;
transmitting the gesture manipulation command,
receiving configuration information;
performing a gesture recognition according to the configuration information;
generating a configuration command according to a gesture recognition result; and
transmitting the configuration command,
wherein the configuration command comprises a configuration command of dynamically adjusting a frame rate generated in accordance with the gesture recognition result.

6. The gesture recognition method according to claim 5, further comprising: predicting a motion trajectory of a hand based on the gesture recognition result.

7. A gesture recognition system, comprising the gesture recognition device according to claim 1 and a gesture recognition server, the gesture recognition server comprising a second network communication unit, a video decoding unit, a gesture recognition unit, and a parameter configuration unit; wherein
the second network communication unit is configured to receive video stream data comprising gesture image data and to transmit a gesture manipulation command;

the video decoding unit is configured to decode the video stream data to obtain the gesture image data;

the gesture recognition unit is configured to perform gesture recognition on the gesture image data and generate a gesture manipulation command in the case of a gesture operation, the second network communication unit is further configured to receive configuration information and to transmit a configuration command;

the gesture recognition unit is further configured to select a gesture recognition algorithm according to the configuration information; and the parameter configuration unit is configured to generate the configuration command in accordance with gesture recognition result of the gesture recognition unit or the gesture recognition algorithm, wherein the configuration command comprises a configuration command of dynamically adjusting a frame rate generated in accordance with the gesture recognition result.

8. The gesture recognition system according to claim 7, wherein the gesture recognition unit is further configured to predict a motion trajectory of a hand based on the gesture recognition result.

* * * * *